United States Patent
Yamanaka et al.

(10) Patent No.: US 7,202,412 B2
(45) Date of Patent: *Apr. 10, 2007

(54) PHOTOVOLTAIC CELL INCLUDING POROUS SEMICONDUCTOR LAYER, METHOD OF MANUFACTURING THE SAME AND SOLAR CELL

(75) Inventors: Ryohsuke Yamanaka, Gojo (JP); Naoki Koide, Kitakatsuragi-gun (JP); Liyuan Han, Kitakatsuragi-gun (JP); Yasuo Chiba, Kitakatsuragi-gun (JP); Hisako Imai, Kashihara (JP); Takehito Mitate, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 616 days.

This patent is subject to a terminal disclaimer.

(21) Appl. No.: 10/339,410

(22) Filed: Jan. 10, 2003

(65) Prior Publication Data

US 2003/0140963 A1 Jul. 31, 2003

(30) Foreign Application Priority Data

Jan. 18, 2002 (JP) ............................. 2002-010166
Feb. 8, 2002 (JP) ............................. 2002-032900

(51) Int. Cl.
*H01L 31/00* (2006.01)
(52) U.S. Cl. ..................... 136/263; 136/252
(58) Field of Classification Search ......... 136/243–265
See application file for complete search history.

(56) References Cited

U.S. PATENT DOCUMENTS 6,084,176 A * 7/2000 Shiratsuchi et al. ........ 136/263
6,384,321 B1 * 5/2002 Mikoshiba et al. ......... 136/263
6,677,516 B2 * 1/2004 Chiba et al. ................ 136/263

FOREIGN PATENT DOCUMENTS

| JP | 2664194 | 9/1989 |
| JP | 2001-76772 | 3/2001 |
| JP | 2002-222971 | 8/2002 |
| JP | 2003-217688 | 7/2003 |
| JP | 2003-217690 | 7/2003 |
| JP | 2004-172110 | 6/2004 |
| JP | 2005-336579 | 12/2005 |

OTHER PUBLICATIONS

J. Am. Chem. Soc., 115 (1993) 6382-6390.
"Chemistry of Adsorption" p. 66, 3rd edition, on Sep. 5, 1993.
J. Am. Chem. Soc., vol. 80, No. 12 (1997) 3157-3171.
Nature, 353 (1991) 737.
Technical Information Institute Co., Ltd., "Development of titanium oxide photocatalyst and application to fields of environment and energy", Dec. 22, 1997, (4pgs).
Catalog of titanium oxide of Ishihara Sangyo Kaisha, Ltd., (5pgs).
Technical Information Institute Co., Ltd., "Development of titanium oxide photocatalyst and application to fields of environment and energy", Dec. 22, 1997, (4pgs) (with partial English translation thereof).

* cited by examiner

*Primary Examiner*—Nam Nguyen
*Assistant Examiner*—Jeffrey Barton
(74) *Attorney, Agent, or Firm*—Nixon & Vanderhye P.C.

(57) ABSTRACT

A photovoltaic cell comprises: an anode electrode including a conductive support and a porous semiconductor layer; a photosensitive dye; a charge transport layer; and a counter electrode support, wherein the anode electrode has the property of causing cathode luminescence having a luminous peak wavelength in a visible region and shows a haze rate H of 60% or more at a wavelength in the visible region.

10 Claims, 12 Drawing Sheets

PHOTOVOLTAIC CELL INCLUDING POROUS SEMICONDUCTOR LAYER, METHOD OF MANUFACTURING THE SAME AND SOLAR CELL

CROSS-REFERENCE TO RELATED APPLICATIONS

This application is related to Japanese Patent Application No. 2002-32900 filed on 8 Feb. 2002 and No. 2002-10166 filed on 18 Jan. 2002, whose priority are claimed under 35 USC § 119, the disclosures of which are incorporated by reference in its entirety.

BACKGROUND OF THE INVENTION

1. Field of the Invention

The present invention relates to a photovoltaic cell including a porous semiconductor layer, a method of manufacturing the same and a solar cell. More specifically, the present invention relates to a photovoltaic cell including a highly efficient porous semiconductor layer which makes use of a photoelectric conversion function of an organic material and is manufactured at low cost, a method of manufacturing the same, as well as a solar cell.

2. Description of Related Art

In connection with global-warming issues, solar cells capable of converting sunlight into electric power have recently received attention as an energy source alternative to fossil fuels. At present, some of solar cells utilizing a crystalline silicon substrate or an amorphous silicon thin film have been put into practical use. However, the former involves high cost for manufacturing the silicon substrate, while the latter requires a variety of semiconductor gases and a complicated manufacturing apparatus including vacuum equipment. That is, even now the cost for manufacturing the solar cells is high and there are problems unsolved.

On the other hand, a dye-sensitized solar cell is gaining the spotlight for its higher photoelectric conversion efficiency as compared with other organic solar cells. The dye-sensitized solar cell uses as a photoelectric conversion material a semiconductor layer on which a spectrum sensitive dye for absorbing light in the visible region is adsorbed (hereinafter, a dye functioning as a photosensitizer is simply referred to as a "dye"). This solar cell has been proposed as a low-cost solar cell.

For example, a dye-sensitized solar cell to which photo-induced electron transfer in a metal complex is applied has been proposed by Gratzel, et al. (see Japanese Patent Gazette No. 2664194, J. Am. Chem. Soc., 115 (1993) 6382, Nature, 353 (1991) 737). The dye-sensitized solar cell is comprised of two glass substrates each carrying an electrode and a photoelectric conversion layer and a charge transport layer which are provided between the electrodes. The photoelectric conversion layer is a porous semiconductor layer on which a photosensitive dye is adsorbed (e.g., a $TiO_2$ thin film). An absorption spectrum thereof lies in the visible region.

Japanese Patent No. 2664194 describes a dye-sensitized solar cell using a metal oxide semiconductor on which a dye made of a transition metal complex is adsorbed.

Here, an explanation is given of manufacturing steps of a common dye-sensitized solar cell.

First, a transparent conductive layer is formed on a surface of a transparent support. A porous semiconductor layer made of titanium oxide is formed on the transparent conductive layer and a dye is adsorbed thereon. Then, a counter electrode coated with a catalyst such as platinum is stacked on the transparent support so that the porous semiconductor layer and platinum are faced to each other. Then, an electrolyte solution which serves as a charge transport layer is injected between the transparent support and the counter electrode and the sides of the transparent support and the counter electrode are sealed with an epoxy resin.

The porous semiconductor layer is formed by coating a suspension containing semiconductor particles on the support, followed by drying and baking at high temperature. The suspension is prepared by adding 4 ml of water and 0.4 ml of acetylacetone to 12 g of fine particles of titanium oxide (P-25 manufactured by Degussa), dispersing the particles in a mortar, diluting the resulting solution with 16 ml of water and adding 0.2 ml of Triton X-100 manufactured by Aldrich as described in J. Am. Chem. Soc. 1993, 115, pp. 6382–6390.

The titanium oxide layer made by using the suspension takes a porous structure. Therefore, the dye is supported in a large amount and a photocurrent value increases. If a polymer such as polyethylene glycol is added to the suspension, the resulting titanium oxide layer takes higher porosity and the dye is supported in a larger amount.

When the photoelectric conversion layer of the dye-sensitized solar cell is irradiated with light, electrons are generated, which are transferred to a counter electrode through an external electric circuit. The electrons transferred to the counter electrode are carried by ions of the charge transport layer and return to the photoelectric conversion layer. Electric energy is generated in such a manner.

Taking such an operation principle into consideration, various attempts have been made with a view to achieving high photoelectric conversion efficiency. In general, improvement in short circuit current density (Jsc) is an important factor for enhancing the photoelectric conversion efficiency of the solar cell. As the porous semiconductor layer in charge of photoelectric conversion, oxide semiconductors such as $TiO_2$, $ZnO$ and $SnO_2$ are considered. It has been reported that a thin film of anatase-type $TiO_2$ which is excellent in photocatalytic effect shows the highest photoelectric conversion efficiency. Under these circumstances, there have been attempted (i) development of a photosensitive dye which absorbs a large amount of light, (ii) control of the particle diameter of the semiconductor particles of the porous semiconductor layer and (iii) increase in film thickness of the porous semiconductor layer with a view to improving the Jsc.

However, for the above (i), a photosensitive dye which is superior to Ru dyes reported as effective in the early times has not been developed though intense researches have been made into organic dyes and metal complex dyes.

For the above (ii), the control of the particle diameter of the semiconductor particles of the porous semiconductor layer is intended to increase the amount of the photosensitive dye adsorbed on the porous semiconductor layer and improve the Jsc. For example, Japanese Unexamined Patent Publication No. 2001-76772 discloses a technique for the control. According to the technique, hollow particles of metal oxide having an average particle diameter of 200 nm to 10 μm are contained in the porous semiconductor layer, thereby providing an oxide semiconductor electrode capable of adsorbing the photosensitive dye and diffusing the charge transport layer sufficiently and easily.

However, even if such hollow particles are contained, there is a limit to the amount of the adsorbed photosensitive dye per unit area of the semiconductor layer. Therefore, there has been no other means of improving the Jsc sufficiently than increasing the film thickness of the porous semiconductor layer.

For the above (iii), if the porous semiconductor layer is thickened, it adsorbs a larger amount of the photosensitive dye and absorbs a larger amount of light. However, electric resistance in the porous semiconductor layer and contact resistance at an interface between the semiconductor electrode and the photosensitive dye increase. That is, even if the porous semiconductor layer is thickened with a view to improving the Jsc, a fill factor (FF) is reduced and hence there is posed a limit in effectively converting light into electric energy. Therefore, it has been difficult to achieve high photoelectric conversion efficiency ($E_{ff}$).

According to the prior art, dye-sensitized solar cells having the porous semiconductor layers of varying thicknesses were formed. They showed a monotonous increase in Jsc in response to the increase in thickness as shown in FIG. 12. However, the FF was reduced in response to the increase of the Jsc. Accordingly, it was recognized that the conversion efficiency does not increase so much as the Jsc does in response to the increase in thickness (see Comparative Example 1).

From the viewpoint of practical use of the dye-sensitized solar cell, it is necessary, not only to improve the conversion efficiency, but to evaluate and control the properties of the anode electrode so that the so solar cell can be manufactured with stability and high yield. However, there has not been established a simple and effective method of evaluating the anode electrode, which presents a problem in industrialization.

The porosity of the porous semiconductor layer has been evaluated by a specific surface area or a surface roughness coefficient which is described in Japanese Patent Gazette No. 2664194. The "surface roughness coefficient" mentioned herein signifies the ratio between an actual surface area (i.e., an effective surface area) and a projected area of an actual surface of a certain substance.

For the adsorption of the dye on the porous semiconductor layer, the porous semiconductor layer having a thickness of about several μm to several tens of μm is immersed in a solution of the dye dissolved in an organic solvent such as ethanol. Accordingly, even if the porous semiconductor layer actually has a specific surface area or a surface roughness coefficient which seems to allow sufficient adsorption of the dye, dye molecules cannot permeate into the inside of the porous semiconductor layer unless the porous semiconductor layer has a pore radius and pore volume which allow easy permeation of the dye dissolved in the solution. Therefore, there has been a problem in that the dye cannot be adsorbed sufficiently.

SUMMARY OF THE INVENTION

The present invention provides a photovoltaic cell comprising: an anode electrode including a conductive support and a porous semiconductor layer; a photosensitive dye; a charge transport layer; and a counter electrode support, wherein the anode electrode has the property of causing cathode luminescence having a luminous peak wavelength in a visible region and shows a haze rate H of 60% or more at a wavelength in the visible region.

Further, the present invention provides a photovoltaic cell comprising: an anode electrode including a conductive support and a porous semiconductor layer; a photosensitive dye; and a counter electrode support which are stacked in this order, wherein the pore volume with respect to a predetermined pore radius of the porous semiconductor layer is 20 $mm^3/nm\cdot g$ or more.

Moreover, the present invention provides a solar cell comprising the above photovoltaic cell.

Still further, the present invention provides a method of manufacturing a photovoltaic cell comprising the steps of: (a) forming a transparent electrode layer on a support to obtain a conductive support and forming a porous semiconductor layer on the conductive support to obtain an anode electrode using material and conditions selected such that the anode electrode has the property of causing cathode luminescence having a luminous peak wavelength in a visible region and shows a haze rate H of 60% or more at a wavelength in the visible region; (b) making a photosensitive dye adsorbed on the surface and/or in the inside of the porous semiconductor layer; (c) forming a counter electrode layer on a support to obtain a counter electrode support, press-bonding the anode electrode of the conductive support and the counter electrode layer of the counter electrode support and filling a charge transport layer therebetween; and (d) optionally sealing the charge transport layer with a sealing material, thereby to obtain a dye-sensitive solar cell.

According to the above, the present invention improves the Jsc without decreasing the FF, thereby providing a highly efficient dye-sensitized solar cell with stability and high yield.

That is, as a result of repeated experiments on the dye-sensitized solar cell comprising the anode electrode including the conductive support and the porous semiconductor layer; the photosensitive dye; the charge transport layer and the counter electrode support, the inventors of the present invention have found that a highly efficient dye-sensitive solar cell can be manufactured at low cost by suitably controlling the property of causing cathode luminescence (hereinafter referred to as a cathode luminescence property) and the haze rate H of the anode electrode.

Further, the inventors have also found that the dye molecules are sufficiently permeated into the inside of the porous semiconductor layer where the pore volume with respect to a predetermined pore radius of the porous semiconductor layer is 20 $mm^3/nm\cdot g$ or more and that a photovoltaic cell and a solar cell manufactured by using the photoelectric conversion layer show excellent photoelectric conversion efficiency.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
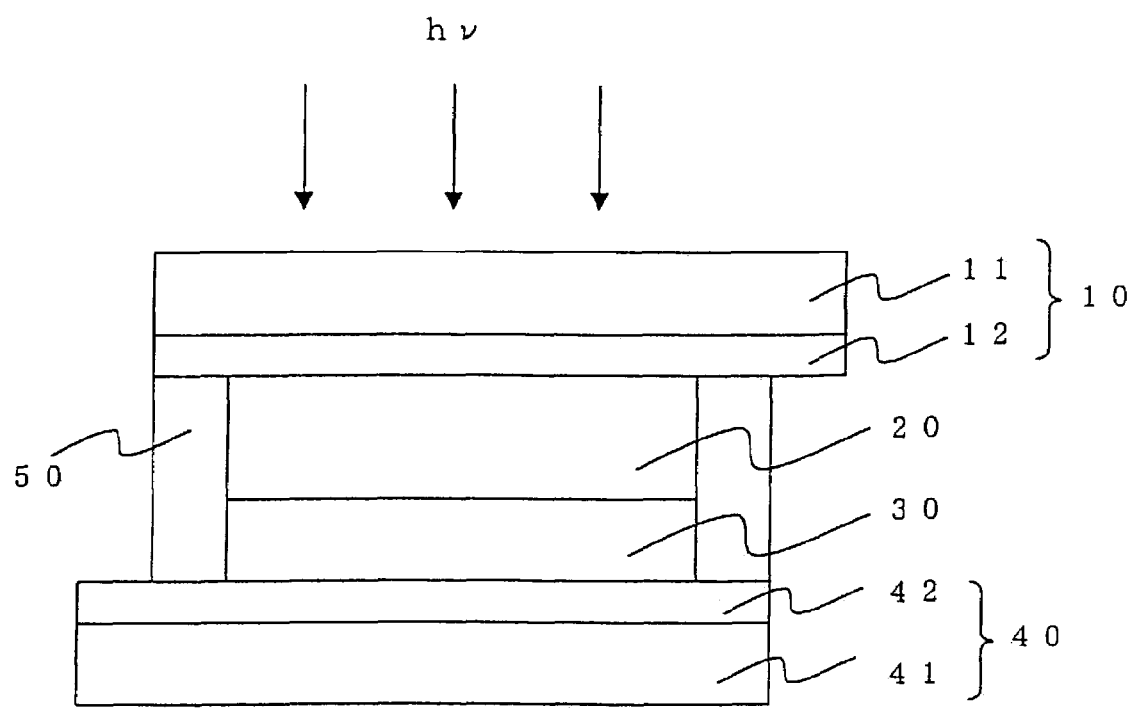
FIG. 1 is a schematic sectional view illustrating a photovoltaic cell according to the present invention.

A photovoltaic cell according to the present invention is mainly comprised of a porous semiconductor layer formed on a conductive support and a counter electrode support formed thereon. A photosensitive dye is adsorbed on the surface and in the inside of the porous semiconductor layer. Further, a charge transport layer may optionally be filled between the porous semiconductor layer and the counter electrode support and the sides thereof may be sealed with a sealing material.

The conductive support used in the photovoltaic cell of the present invention may be a support on which a conductive film is formed or a support which is rendered conductive by introducing impurities therein.

The support is not particularly limited as long as it carries and reinforces the photovoltaic cell and the solar cell including the element. Examples of a support material include glass; heat resistant polymer films of polyimide, PET, PEN, PES and Teflon; metals such as stainless steel (SUS) and an aluminum plate; and ceramics which are used alone or in a multilayer structure. Among them, highly transparent materials are preferable. The support may have a flat surface or a rough surface.

The conductive film formed on the support is not particularly limited. For example, the conductive film may be a single layer or a multilayer of metals such as platinum, gold, silver, copper, aluminum, rhodium and indium, carbon, transparent materials such as ITO, $SnO_2$, $In_2O_3$ and ZnO and those doped with impurities such as F, Sb, Sn, Al and Ga, for example, $SnO_2$:F, $SnO_2$:Sb, $In_2O_3$:Sn, ZnO:Al, ZnO:Ga and the like. The thickness of the conductive film is not particularly limited, but preferably about 3 nm to 10 μm. If the conductive film is made of a metal material, the thickness thereof is preferably about 5 μm or less, more preferably about 3 μm or less. The conductive film may have a flat surface or a rough surface.

The conductive film may be formed on the support by sputtering, vacuum deposition, EB deposition, atmospheric pressure CVD, reduced pressure CVD, PVD, a sol-gel method or electrocrystallization using the above-described conductive material. The roughness on the surface of the conductive film is formed by causing crystal growth of a selected conductive material on the support in a random fashion under the conditions for film formation by a vapor-phase method established appropriately. More specifically, the crystal growth of the conductive film is caused on the support in a random fashion under suitably selected atmosphere such as oxygen or inert gas and temperature. Alternatively, conditions for etching using an acidic solution such as acetic acid and hydrochloric acid, e.g., etching time, may be established to etch the conductive film having a flat surface to give roughness thereon. For example, suitable Rmax of the roughness may be about 0.1 to 1 μm.

The conductive support may have any shape as long as it withstands a certain force and weight. The shape of the conductive support may suitably be adjusted depending on the sizes of the photovoltaic cell and the dye-sensitized solar cell using the element. Further, an insulating film, a buffer layer or both of them may be formed depending on use of the conductive support.

The porous semiconductor layer used in the present invention may be made of a known semiconductor material such as titanium oxide, zinc oxide, tungsten oxide, barium titanate, strontium titanate and cadmium sulfide. Among them, titanium oxide or zinc oxide is preferable in view of conversion efficiency, stability and safety. These materials may be used alone or in combination of two or more of them and a single layer or a malti-layer of two or more of them. These materials preferably have an n-type conductivity.

There is no particular limitation to the thickness of the porous semiconductor layer. However, the thickness is preferably about 0.5 to 20 μm in view of transmissivity and conversion efficiency.

Various known methods may be used to form the porous semiconductor layer. More specifically, the porous semiconductor layer may be formed by coating a suspension of particles of the above-described semiconductor optionally containing a dispersing agent, an organic solvent, water and the like on the conductive support, followed by drying and baking.

Examples of a solvent used in the suspension include glime solvents such as ethylene glycol monomethyl ether, alcoholic solvents such as isopropyl alcohol, a mixture solvent of isopropyl alcohol/toluene, and water. These solvents may be used alone or in combination of two or more of them In order to enhance the porosity of the porous semiconductor layer and increase the amount of dye supported by the porous semiconductor layer, the suspension may be added with a polymer such as polyethylene glycol.

The suspension may be coated by a known method, for example, a method using a doctor blade or a squeegee, spin coating or screen printing.

The drying and baking of the porous semiconductor layer may be performed under the conditions of temperature, time and atmosphere suitably adjusted depending on the types of the support and the semiconductor particles used. For example, the drying and baking may be performed under atmospheric air or an inert gas atmosphere at about 50 to 800° C., preferably about 400 to 500° C., for about 10 seconds to 12 hours. The drying and baking may be performed one time at the same temperature or two or more times at different temperatures.

The porous semiconductor layer on the conductive support may be formed by CVD or MOCVD using a desired material gas, or PVD, vapor deposition, sputtering or a sol-gel method using a solid material.

Upon formation of the porous semiconductor layer, composition of the mixture solution, time for dispersing the solution, temperature for baking the coated film and the like are controlled. Thereby, the anode electrode gains the property of causing cathode luminescence having a luminous peak wavelength in the visible region and shows the haze rate H of 60% or more, 70% or more preferably 80 to 90%, at a wavelength in the visible region, or alternatively, the pore volume with respect to a predetermined pore radius of the porous semiconductor layer is controlled to 20 mm$^3$/nm·g or more.

Here, the "property of cathode luminescence" signifies a phenomenon of light emission caused by irradiation of an accelerated electron beam. This phenomenon is observed by detecting with a photodetector an emission spectrum generated by irradiating the electron beam in a dark state onto the surface of the porous semiconductor layer of the anode electrode placed in a vacuum. According to the present invention, "cathode luminescence having a luminous peak wavelength in the visible region" signifies that the luminous peak of the cathode luminescence lies in the visible region (400 to 700 nm).

Further, the "haze rate H" is a value obtained by dividing a diffuse transmittance of a light beam which has a spectrum in the visible region and is incident on an object by a transmittance of the whole light beam. The haze rate H is represented by a value from 0 to 1 or a percentage % of 0 to 100. More specifically, a light beam is irradiated onto the porous semiconductor layer of the anode electrode and the transmittance of the whole light beam and the diffuse transmittance are measured to obtain the haze rate H. This measurement is simple and easy because it only requires an illuminant and an apparatus having a light quantity measuring section.

The light beam having a spectrum in the visible region is not particularly limited as long as it has intensity at least in the visible region (400 to 700 nm). Suitably used are typical daylights, for example, ISO and CIE standard illuminants such as a standard illuminant D65 (color temperature: 6,504 K) and a standard illuminant C (color temperature: 6,774 K) which is used as an alternative to a north window light beam.

Actually, the measurement is carried out using an apparatus provided with an integrating sphere which is in close contact with a measurement sample and a light trap (a black box) or a standard plate placed on the side of the measurement sample opposite to the integrating sphere. More specifically, in a state where the standard plate is placed, light quantity T1 of an incident light beam is measured in the absence of the measurement sample and light quantity T2 of the whole transmitted light beam is measured in the presence of the measurement sample. Further, in a state where the light trap is placed, light quantity T3 of a diffused light beam from the apparatus is measured in the absence of the measurement sample and light quantity T4 of a diffused transmitted light beam is measured in the presence of the measurement sample. From the obtained values, the transmittance of the whole light Tt=T2/T1 and the diffuse transmittance Td=[T4−T3(T2/T1)]/T1 are calculated to obtain the haze rate H=Td/Tt.

The pore volume is represented by:

$$\Delta Vp/\Delta R \text{ mm}^3/\text{nm·g}$$

(wherein $\Delta Vp$ is pore volume per unit weight and $\Delta R$ is a variation of pore radius).

As a method of calculating the change rate of the pore volume with respect to the pore radius of the porous semiconductor layer, a nitrogen adsorption method at a liquid nitrogen temperature (77.4 K) and a mercury injection method are considered. In the case of adopting the nitrogen adsorption method, the pore radius and the pore volume are measured and calculated using the Kelvin equation on the assumption that liquid nitrogen entirely moistens the pore surface. Then, based on the obtained data, the change rate of the pore volume with respect to the pore radius is calculated by a Dollimore-Heal method (hereinafter referred to as a "DH method").

This method pays attention to the length of the pore radius and is based on the assumption that all the pores have the shape of a cylinder with opened ends and do not intersect each other. The change rate of the pore volume with respect to the pore radius is calculated by desorption of nitrogen. Detailed explanation is described in "Chemistry of Adsorption" (p. 66, co-authored by Seiichi Kondo, Tatsuo Ishikawa and Ikuo Abe, $3^{rd}$ edition, published by Maruzen Co., Ltd. on 5 Sep. 1993). The porous semiconductor layer of the present invention shows the change rate of the pore volume of 20 mm$^3$/nm·g or more with respect to a predetermined pore radius.

From the viewpoint of higher photoelectric conversion efficiency, it is preferred that the change rate of the pore volume with respect to the pore radius of the porous semiconductor layer reaches a peak when the pore radius is 10 nm or smaller. Further, the change rate of the pore volume with respect to the pore radius of the porous semiconductor layer is preferably 20 mm$^3$/nm·g or more at any time when the pore radius is in the range of 1 to 10 nm.

The porous semiconductor layer preferably adsorbs a photosensitive dye on the surface and/or the inside thereof. The photosensitive dye is not particularly limited as long as it has an absorption spectrum at least in a wavelength region of a sunlight spectrum (200 nm to 10 μm) and discharges electrons generated by photoexcitation to the porous semiconductor layer. Further, for the firm adsorption onto the porous semiconductor layer, the dye preferably contains in its molecule an interlocking group such as a carboxylic acid group, a carboxylic anhydride group, an alkoxy group, a hydroxyl group, a hydroxy alkyl group, a sulfonic acid group, an ester group, a mercapto group and a phosphonyl group. More preferably, the dye contains the carboxylic acid group and the carboxylic anhydride group. The interlocking group provides an electrical bond which facilitates electron transfer between the dye in the excited state and the conductive band of the semiconductor.

For example, usable are organic photosensitive dyes including ruthenium metal complexes such as cis-di(isothiocyanato)-N,N'-bis(2,2'-bipyridyl-4,4'-dicarboxylic acid)ruthenium(II) (hereinafter referred to as compound A), azo dyes, quinone dyes, quinoneimine dyes, quinacridone dyes, squalirium dyes, cyanine dyes, merocyanine dyes, triphenylmethane dyes, xanthene dyes, porphyrin dyes, berylene dyes, phthalocyanine dyes, naphthalocyanine dyes, coumarin dyes and indigo dyes.

The dye may be adsorbed onto the porous semiconductor layer by immersing the support provided with the porous semiconductor layer into a solution in which the dye is dissolved.

The solvent for dissolving the dye is not particularly limited. Examples thereof include alcohols such as ethanol, ketones such as acetone, ethers such as diethyl ether and tetrahydrofuran, nitrogen compounds such as acetonitrile, halogenated aliphatic hydrocarbon such as chloroform, aliphatic hydrocarbon such as hexane, aromatic hydrocarbon such as benzene and esters such as ethyl acetate. These may be used alone or in combination of two or more of them.

The dye concentration in the solvent may suitably be adjusted depending on the types of the dye and the solvent used. It is preferred that the dye concentration is relatively high to improve the adsorptive function, for example, $1\times10^{-6}$ M/l or higher, preferably about $5\times10^{-6}$ to $1\times10^{-2}$ M/l.

Upon immersing the porous semiconductor layer in the solution containing the dissolved dye, temperature and pressure of the solution and atmosphere are not particularly limited. For example, the immersion may be carried out at about room temperature under the atmospheric air. Preferably, the photosensitive dye solution and the porous semiconductor layer are put in a sealed vessel to circulate the photosensitive dye solution in the sealed space. Immersing time is not particularly limited and may suitably be adjusted depending on the types of the dye and the solvent used and the concentration of the solvent. It is also possible to immerse the porous semiconductor layer in the photosensitive dye solution under the atmospheric air for about 5 minutes to 100 hours. If the immersion is carried out under heating, a larger amount of the dye can be adsorbed onto the porous semiconductor layer and hence it is preferable.

The counter electrode support may be the same as the conductive support described above.

Examples of the charge transport layer include an ion conductor, a hole carrier and an electron carrier in the form of liquid, gel or solid.

More specifically, those capable of carrying electrons, holes and ions are considered. For example, hole carriers such as polycarbazol, charge carriers such as tetranitrofluorenone, conductive polymers such as polylol, ion conductors such as a liquid electrolyte and a polyelectrolyte and p-type semiconductors such as copper iodide and copper thiocyanate are used.

The ion conductor is preferably of oxidation-reduction type. Electrolytes which are commonly used in batteries and solar cells may be used. For example, a combination of metal iodide such as LiI, NaI, KI and $CaI_2$ and iodine, as well as a combination of metal bromide such as LiBr, NaBr, KBr and $CaBr_2$ and bromine are preferable, among which a combination of LiI and iodine is more preferable. The concentration of the electrolyte may be 0.1 to 1.5 mol/l, more preferably 0.1 to 0.7 mol/l. As a solvent for the electrolyte, carbonate compounds such as propylene carbonate, nitrile compounds such as acetonitrile, alcohols such as ethanol, water and aprotic polar substances are used. Among them, the carbonate compounds and the nitrile compounds are preferable. More specifically, considered are an iodine ion conductor obtained by dissolving tetrapropylammonium iodide and iodine in a solvent such as acetonitrile, an iodine ion conductor obtained by dissolving lithium iodide, iodine and dimethylpropyl imidazolium iodine in a solvent such as 3-methoxy propionitrile and an iodine ion conductor obtained by dissolving lithium iodide and iodine in a mixture solvent of acetonitrile and ethylene carbonate (volume ratio=1:4). Further, an electrolyte such as iodide, bromide and hydroquinone or a redox electrolyte may be formed into a film.

The sealing material is not particularly limited as long as it prevents leakage of the charge transport layer. More specifically, an epoxy resin, a silicon resin and a thermoplastic resin may be used. If the charge transport layer is made of a solid material and there is no possibility of the leakage, the sealing material is not always necessary.

With respect to the photovoltaic cell of the present invention, the haze rate H is measured after the transparent electrode layer or the porous semiconductor layer is formed. If the haze rate H is measured after the formation of the porous semiconductor layer, i.e., before the porous semiconductor layer adsorbs the photosensitive dye, the porous semiconductor layer showing the haze rate H of 60% or more can be sorted out. Thereby, the manufacture of dye-sensitized solar cells having impaired characteristics is avoided and hence highly efficient dye-sensitized solar cells can be manufactured with stability and high yield (at low cost). That is, both of improvement in Jsc and high FF can be achieved on the following principle.

In a dye-sensitized solar cell including a conductive support which does not cause light scattering, the haze rate H of the porous semiconductor layer increases. Then, the number of times of light irradiation to the photosensitive dye increases due to the light scattering. As a result, the photosensitive dye absorbs a larger quantity of light. That is, even in the case where the thickness and the amount of the photosensitive dye adsorbed are fixed, the porous semiconductor layer having a higher haze rate H (60% or more, preferably 80 to 90%) shows a higher Jsc.

This does not signify that the number of times of light irradiation to the photosensitive dye and the haze rate H are in a simple proportionality relation. As the haze rate H increases, the number of times of light irradiation to the photosensitive dye also increases. In the case where the haze rate H is 60% or more, the number of times of light irradiation to the photosensitive dye increases rapidly. That is, high Jsc is obtained by controlling the haze rate H of the anode electrode to 60% or more.

The number of times of light irradiation to the photosensitive dye can also be increased by raising the haze rate H of the conductive support instead of boosting that of the porous semiconductor layer.

Accordingly, by controlling both of the haze rate H of the conductive support and that of the porous semiconductor layer, further improvement in Jsc, i.e., improvement in photoelectric conversion efficiency, is expected. As one example, the above-described optical effect is remarkably observed in a dye-sensitized solar cell comprised of a combination of a conductive support including a transparent conductive oxide film having a refractive index of about 2.0 (e.g., $SnO_2$ or ZnO doped with several % of impurities) and a porous semiconductor layer made of a $TiO_2$ film having a refractive index of about 2.5.

By merely increasing the haze rate H of the porous semiconductor layer, Jsc may improve due to the light scattering. However, a distance traveled by charges flowing through the anode electrode also increases, which increases electric resistance in the porous semiconductor and hence the FF may possibly be reduced. However, if the anode electrode has the property of causing cathode luminescence, high FF can be obtained.

In general, on the surface and in the inside of the porous semiconductor layer, a defect level derived from compositional deviation from the stoichiometric composition ratio and a level derived from impurities are present in the forbidden band. When the porous semiconductor layer is irradiated with an accelerated electron beam, electrons are excited by the electron beam from a valence band to a conduction band, changed to the level in the forbidden band, and then recombined with holes in the valence band. If the film quality of the porous semiconductor layer is poor, the recombination does not involve light emission. However, if the film quality such as crystallinity is enhanced, the recombination accompanied with light emission (property of cathode luminescence) is observed in a vacuum and in a dark state. That is, the porous semiconductor layer having the cathode luminescence property is a high quality film with high crystallinity. Even in the case where the thickness and the amount of the photosensitive dye adsorbed are fixed, the film having the cathode luminescence property reduces a loss due to internal resistance and hence shows a higher FF, as compared with a film without the property.

Upon actual operation of the photovoltaic cell or the dye-sensitized solar cell according to the present invention, the level in the forbidden band is occupied by the electrons excited from the valence band by sunlight irradiation (visible light) and hence electrons in the conduction band of the porous semiconductor layer cannot be transferred to the level in the forbidden band since the luminous peak of the cathode luminescence property lies in the visible region (400 to 700 nm). In other words, the above-described recombination does not occur upon actual use. Therefore, reduction in Jsc due to a recombination current does not occur and hence high Jsc is obtained.

Further, where the anode electrode shows a dimensionless amount α represented by the formula:

$$\alpha = S \times H \times c$$

(wherein H is the haze rate of the anode electrode at a wavelength in the visible region (0.6<H<1), S is a specific surface area [m$^2$/g] of the porous semiconductor layer and c is area density [g/m$^2$] of the porous semiconductor layer) of 1,000 or more, preferably 1,500 or more, remarkable improvement in Jsc is observed without reducing the FF. The dimensionless amount α is a product of a physical amount S×c related to an effective surface area of the film and a physical amount H related to the number of times of light irradiation to the photosensitive dye molecules. The larger the dimensionless amount α is, the more light is absorbed in the photosensitive dye, thereby improving the Jsc. The upper limit of the dimensionless amount α is preferably about 15,000.

The measurement of the haze rate H is also adopted in the evaluation of a TCO glass plate used in a solar cell including an amorphous silicon thin film as means of obtaining an index of an optical path length in the thin film. However, with respect to an amorphous silicon solar cell which requires a process in a vacuum, it is not easy to perform direct evaluation of the glass plate and the amorphous silicon thin film used in the manufacture, which makes the process difficult. Further, since an absorption coefficient of the amorphous silicon solar cell is as large as about 10$^5$ cm$^{-1}$, the improvement in Jsc by controlling the haze rate H is not so remarkably observed.

On the other hand, with respect to the dye-sensitized solar cell according to the present invention in which the porous semiconductor layer is used in the anode electrode, the light absorption coefficient of the photosensitive dye is relatively small, so that the improvement in Jsc by controlling the haze rate H is noticeable. Further, since there is no need of the in-vacuum process in the manufacture, the haze rate can be measured easily. Especially, in the case of using a porous TiO$_2$ layer in the anode electrode, the resulting porous TiO$_2$ layer is apt to have variations in property even if the diameter of TiO$_2$ fine particles and the conditions for mixing and baking TiO$_2$ paste are elaborately controlled. The present invention, however, allows the manufacture of an excellent dye sensitized solar cell with stability and high yield (at low cost).

The photovoltaic cell according to the present invention includes a translucent conductive support through which light can enter. Thereby, a super straight type solar cell can be manufactured. Further, a sub straight type solar cell can also be manufactured by using a translucent counter electrode support and a translucent conductive film so that light enters from the side opposite to the conductive support. Moreover, the photovoltaic cell according to the present invention can also be applied to an optical switching device, a sensor and the like.

Hereinafter, detailed explanation is given of the photovoltaic cell of the present invention.

EXAMPLE 1

As shown in FIG. 1, a photovoltaic cell according to this example includes a porous semiconductor layer 20 formed on a conductive support 10, on which a photosensitive dye is adsorbed, a counter electrode support 40, a charge transport layer 30 filled between the porous semiconductor layer 20 and the counter electrode support 40 and a sealing material 50 sealing the sides thereof. The indication hv in FIG. 1 signifies light.

In this example, explanation is given of the case where the cathode luminescence property and the haze rate H of the porous semiconductor layer 20 are controlled. Also explained are experimental results in which improvement of the property was achieved by appropriately selecting a combination of a specific surface area S of the porous semiconductor layer, the haze rate H and surface density c.

The conductive support 10 was made of a glass substrate 11 on which a thin film of fluorine-doped tin oxide (SnO$_2$:F) was formed by sputtering as a transparent electrode layer 12. The conductive support 10 had a flat surface and showed a sheet resistance of 10 Ω/□ and the haze rate H of 1% or less.

The counter electrode support 40 was made of a glass substrate 41 on which a thin film of fluorine-doped tin oxide (SnO$_2$:F) and a thin platinum film were stacked thereon by sputtering as a counter electrode layer 42. The sheet resistance thereof was 10Ω/□.

The porous semiconductor layer 20 was made of TiO$_2$. More specifically, the porous semiconductor layer 20 was formed in the following manner. First, fine particles of TiO$_2$ (AMT-600 manufactured by Tayca Corporation, about 30 nm in particle diameter) were mixed with a surfactant (Triton-X manufactured by Kishida Chemical Co., Ltd.), zirconia beads (2 mm in diameter) and diethylene glycol monomethyl ether and dispersed using a paint shaker to prepare a $TiO_2$ suspension. The mixing ratio by weight was adjusted so that the concentration of $TiO_2$ was 17.5% and that of Triton-X was 1%. The zirconia beads were added in an amount of 100 g per 40 ml of the solution and dispersing time using the paint shaker was varied between 30 minutes and 8 hours. The thus prepared $TiO_2$ suspension was coated on the conductive support 10 using a doctor blade, which was baked at 500° C. under artificial atmospheric air for 30 minutes, thereby obtaining the porous semiconductor layer 20.

Figure 2:
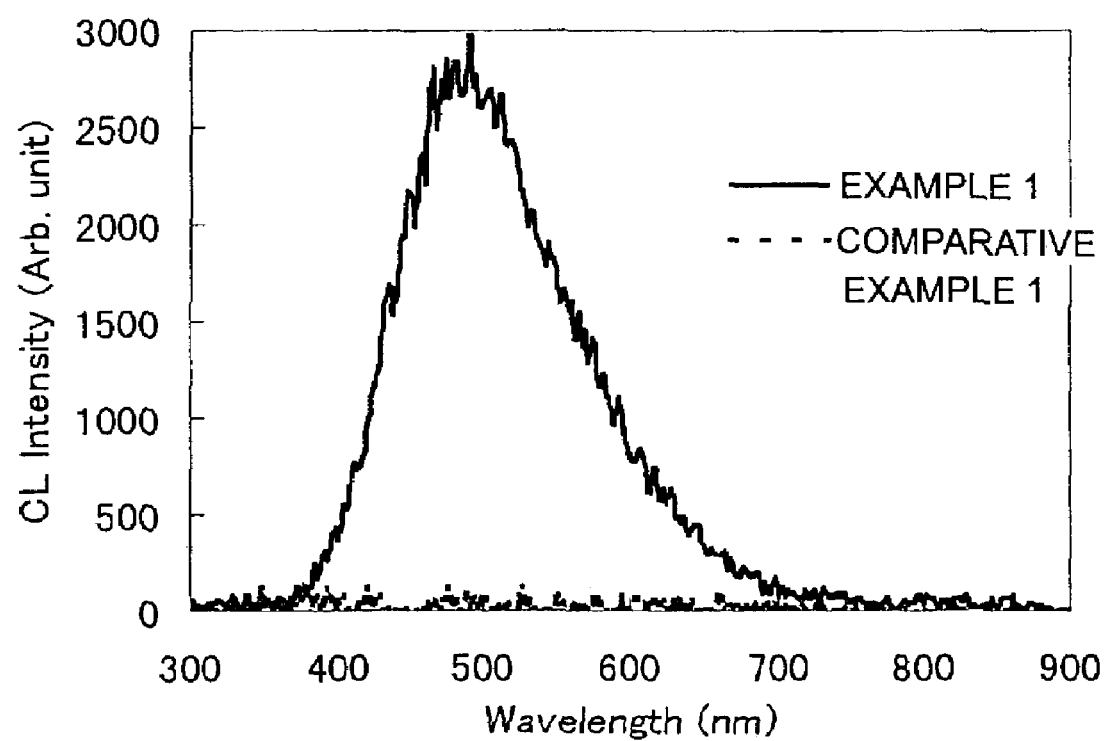
FIG. 2 is a graph illustrating cathode luminescence spectra of porous semiconductor layers of photovoltaic cells according to Example 1 and Comparative Example 1.

The cathode luminescence property of the thus obtained porous semiconductor layer 20 on the conductive support 10 was measured in a vacuum in a dark state. Upon irradiation of an accelerated electron beam of 5 keV and the degree of vacuum of $1 \times 10^{-6}$ torr, a cathode luminescence spectrum (cathode luminescence property) having a peak wavelength at 480 nm was observed. FIG. 2 shows a cathode luminescence spectrum of the porous semiconductor layer made of a $TiO_2$ suspension dispersed for 2 hours.

With respect to the conductive support 10 and the porous semiconductor layer 20, the haze rate H was measured using a standard illuminant C (color temperature: 6,774 K). The haze rate H of the porous semiconductor layers made of $TiO_2$ suspensions dispersed for 30 minutes, 2 hours and 10 hours was 92%, 70% and 8%, respectively. Thus, by varying the dispersing time, porous semiconductor layers having the haze rate H of 8% to 92% were formed.

After the measurement of the cathode luminescence property and the haze rate H, a photosensitive dye was adsorbed onto the porous semiconductor layer 20. As the photosensitive dye, compound A (cis-di(isothiocyanato)-N,N'-bis(2, 2'-bipyridyl-4,4'-dicarboxylic acid)ruthenium(II)) was used. More specifically, the adsorption of the photosensitive dye was performed by immersing the support on which the $TiO_2$ porous semiconductor layer 20 was formed in a solution of the photosensitive dye in ethanol (the photosensitive dye concentration: $1 \times 10^{-4}$ mol/l) for a day.

As the charge transport layer 30, an electrolyte solution containing 0.1 M of lithium iodide, 0.05 M of iodine, 0.6 M of dimethylpropyl imidazolium iodine, 0.5 M of t-butylpyridine and methoxy propionitrile as a solvent was used.

A thermo-adhesive resin film was used as the sealing material 50. The conductive support 10 and the counter electrode support 40 were bonded by thermocompression to form a framework of the dye-sensitized solar cell, in which the electrolyte solution was injected through a hole (injection hole) of 0.5 mm in diameter opened in the counter electrode support.

Thereafter, the injection hole was sealed with the thermo-adhesive resin film and a glass preparation plate.

Using a solar simulator having an artificial solar light spectrum of AM 1.5, a current-voltage property of the thus-formed photovoltaic cell was measured to evaluate the photoelectric conversion property.

Figure 3:
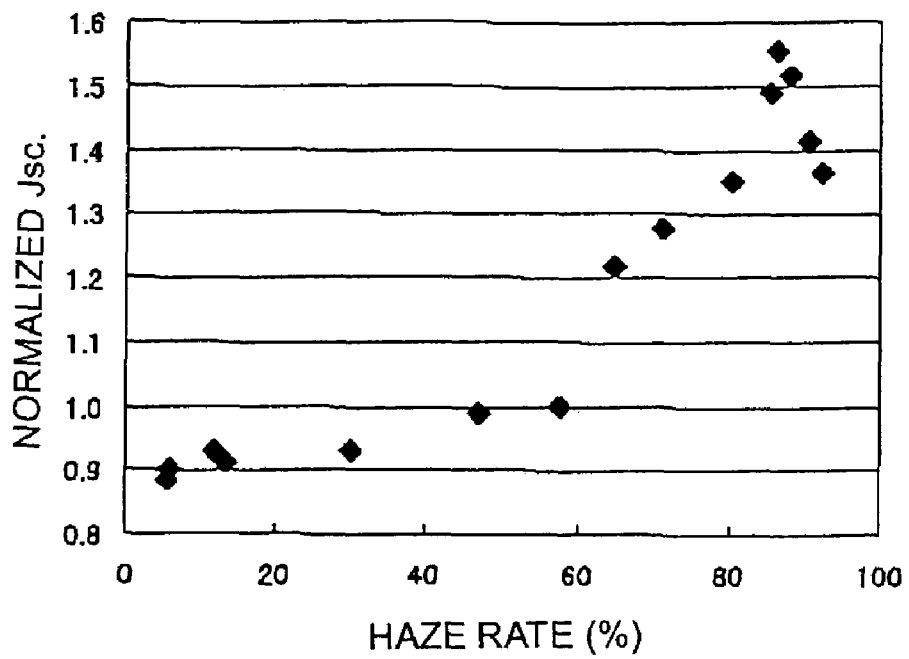
FIG. 3 is a graph illustrating a relationship between normalized short circuit current density Jsc and a haze rate H of the photovoltaic cell according to Example 1.
Figure 4:
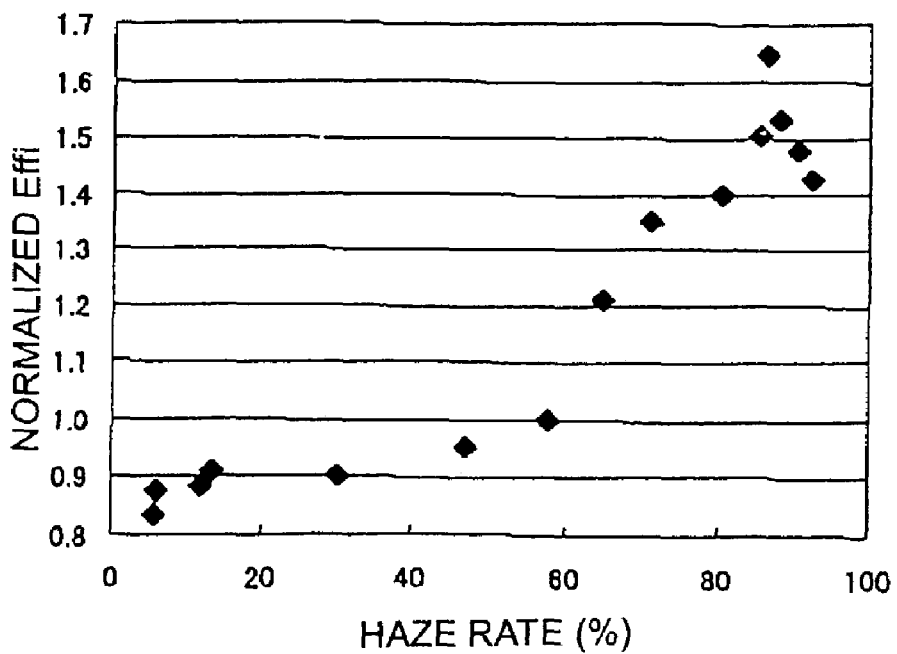
FIG. 4 is a graph illustrating a relationship between normalized conversion efficiency Effi and the haze rate H of the photovoltaic cell according to Example 1.

FIG. 3 shows the dependence of short circuit current density Jsc on the haze rate and FIG. 4 shows the dependence of conversion efficiency Effi on the haze rate. The values of the Jsc and the conversion efficiency shown in the figures are those normalized by the maximum values each obtained in Comparative Example 1 described below.

The results indicate that high Jsc is obtained by controlling the haze rate H of the porous semiconductor layer to 60% or more, and that the property of the dye-sensitized solar cell is improved since the FF is not reduced.

The photovoltaic cell was manufactured and then disassembled to take out the conductive support 10 and the porous semiconductor layer 20 on which the photosensitive dye was adsorbed. The photosensitive dye was desorbed from the porous semiconductor layer using a $1 \times 10^{-3}$ mol/l NaOH solution. Then, the cathode luminescence property of the porous semiconductor layer, the haze rate H of the conductive support and that of the porous semiconductor layer were measured. As a result, similar to the measurement performed before the adsorption of the photosensitive dye, the cathode luminescence spectrum having a peak around 480 nm and the haze rate H within the measurement error range were observed.

Figure 5:
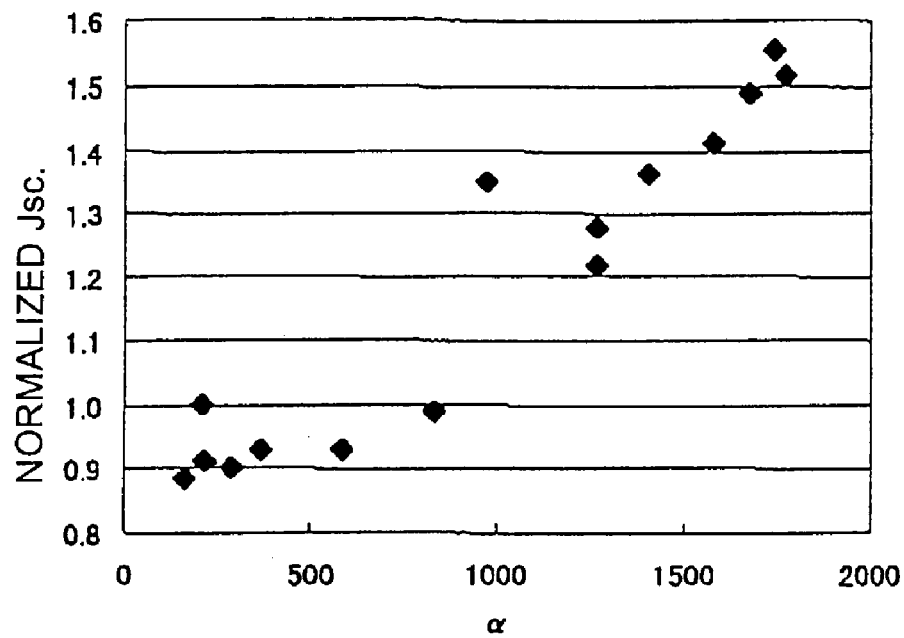
FIG. 5 is a graph illustrating a relationship between the normalized short circuit current density Jsc and a dimensionless amount α of the photovoltaic cell according to Example 1.
Figure 6:
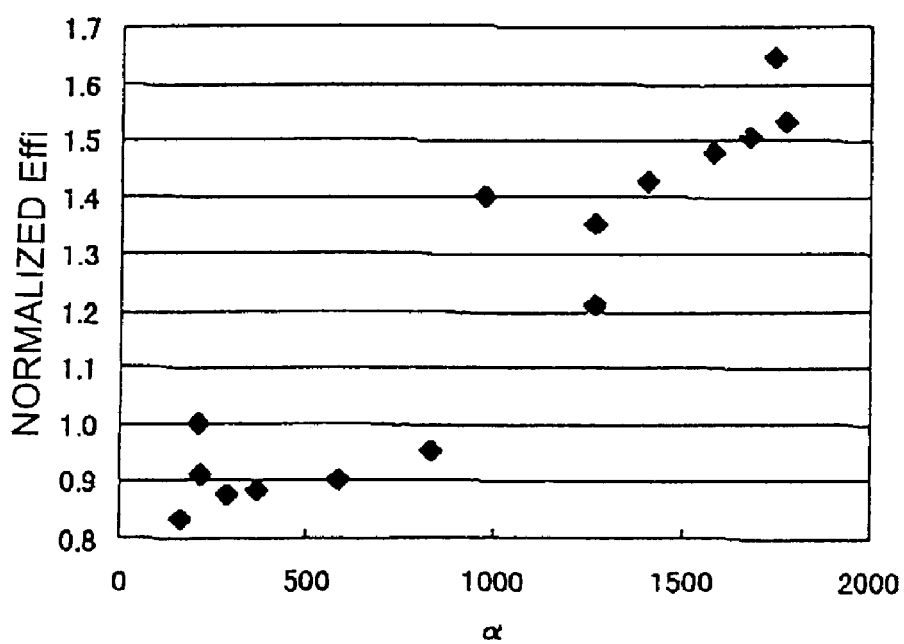
FIG. 6 is a graph illustrating a relationship between the normalized conversion efficiency Effi and the dimensionless amount α of the photovoltaic cell according to Example 1.

FIG. 5 shows a relationship between the short circuit current density Jsc and a dimensionless amount α defined as α=S×H×c on condition that the haze rate of the porous semiconductor layer is H (0.6<H<1), a specific surface area is S [$m^2$/g] and surface density is c [g/$m^2$]. FIG. 6 shows a relationship between the conversion efficiency $E_{ffi}$ and the dimensionless amount α. The figures show that improvement in Jsc is remarkable and the conversion efficiency is enhanced while maintaining the FF where the dimensionless amount α is 1,000 or more, preferably 1,500 or more.

EXAMPLE 2

Figure 7:
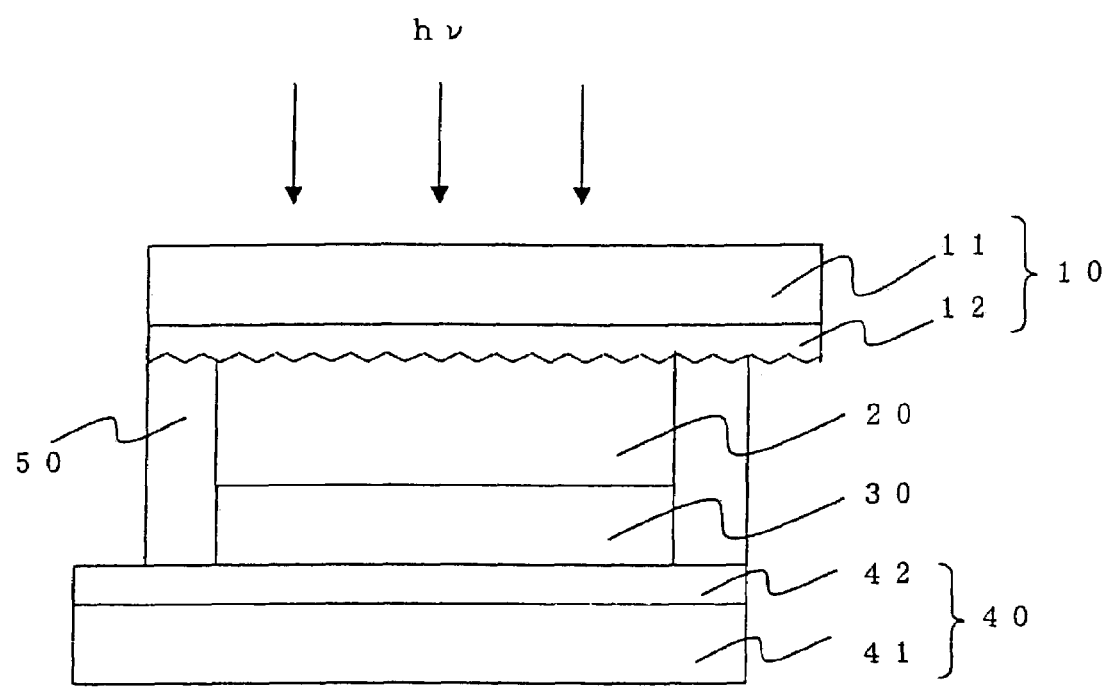
FIG. 7 is a schematic sectional view illustrating another photovoltaic cell according to the present invention.

A photovoltaic cell according to this example is the same as that of Example 1 except that the transparent electrode layer 12 (a thin film of $SnO_2$:F) having a flat surface and the haze rate H of about 0 was replaced with a transparent electrode layer 12 (a thin film of $SnO_2$:F) having a rough surface as shown in FIG. 7 and the haze rate H of about 0 to 30%. The roughness formed on the surface of the transparent conductive layer has Rmax of about 100 to 400 nm.

In this example, explanation is given of experimental results in which the property was improved by appropriately selecting a combination of the specific surface area S, the haze rate H and the surface density c of the porous semiconductor layer.

Other components than the transparent conductive layer 12 were formed in the same manner as Example 1 and hence detailed description thereof is omitted.

The transparent electrode layer 12 was formed in the following manner. First, in the same manner as in Example 1, a flat layer 12 of $SnO_2$:F was formed and then the surface thereof was etched using a 5% hydrochloric acid solution to give roughness thereon. More specifically, the etching was performed for varying time of 0 to 240 seconds to form conductive supports 10 having the haze rate H of 0 to 30%.

On the thus obtained conductive support 10, the porous semiconductor layer 20 was formed in the same manner as Example 1. Then, using a standard illuminant C (color temperature 6,774 K), the haze rate H of the conductive supports and the porous semiconductor layers was measured. By varying the haze rate H of the conductive supports 10, the porous semiconductor layers having the haze rate H of 12 to 95% were formed.

After the measurement of the haze rate H, the photosensitive dye was adsorbed on the porous semiconductor layer 20 in the same manner as Example 1. Compound A was used as the photosensitive dye.

A platinum/ITO thin film was formed as a counter electrode layer 42 on a glass substrate 41 to obtain a counter electrode support 40. Between the counter electrode support 40 and the conductive support 10 and electrolyte solution containing 0.1 M of lithium iodide, 0.05 M of iodine, 0.6 M of dimethylpropyl imidazolium iodine, 0.5 M of t-butylpyridine and methoxy propionyl as a solvent was injected as a charge transport layer 30, which was sealed with a thermo-adhesive resin film as a sealing material 50.

Using a solar simulator having an artificial solar spectrum of AM 1.5, a current-voltage property of the thus manufactured photovoltaic cell was measured to evaluate the photoelectric conversion efficiency.

Figure 8:
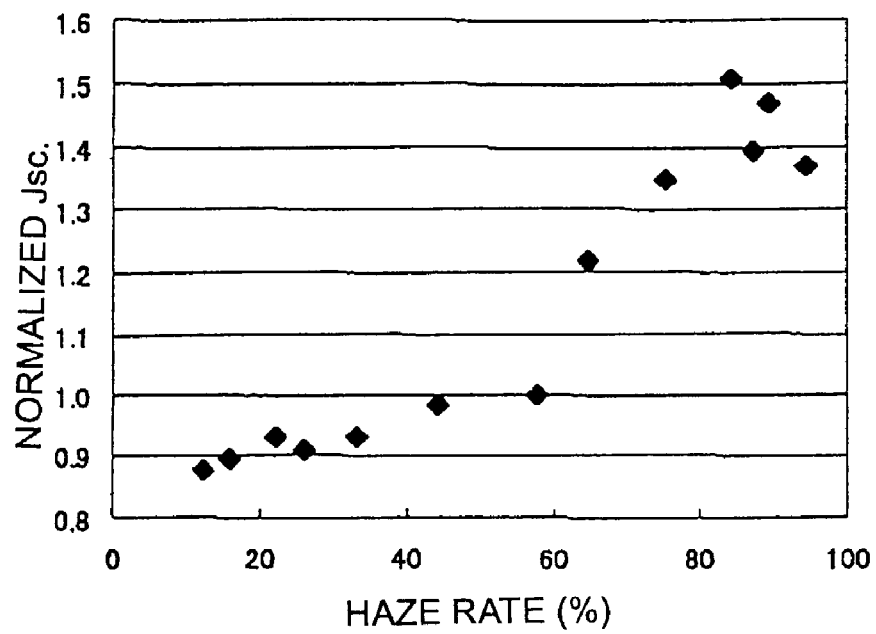
FIG. 8 is a graph illustrating a relationship between the normalized short circuit current density Jsc and the haze rate H of a photovoltaic cell according to Example 2.
Figure 9:
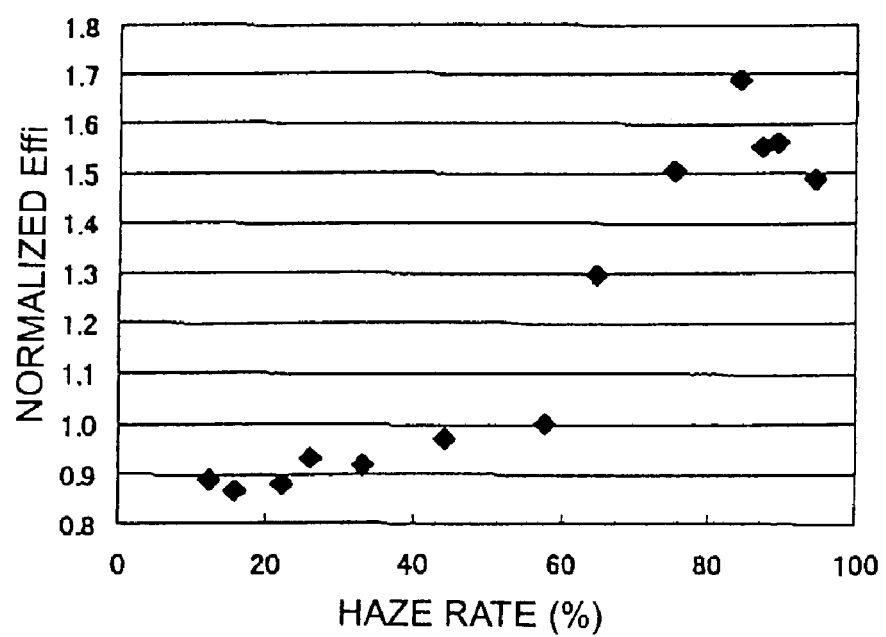
FIG. 9 is a graph illustrating a relationship between the normalized conversion efficiency Effi and the haze rate H of the photovoltaic cell according to Example 2.

FIG. 8 shows the dependence of the short circuit current density Jsc on the haze rate and FIG. 9 shows the dependence of the conversion efficiency Effi on the haze rate. The values of the Jsc and the conversion efficiency are those standardized by the maximum values each obtained in Comparative Example 1 described below.

The results indicate that high Jsc is obtained by controlling the haze rate H of the conductive support and that of the porous semiconductor layer to 60% or more, and the property of the dye-sensitized solar cell is improved since the FF is not reduced.

The haze rate H of the transparent conductive layer can be controlled more easily than that of the porous semiconductor layer. Therefore, this method provides the dye-sensitized solar cell with high conversion efficiency and controllability.

Figure 10:
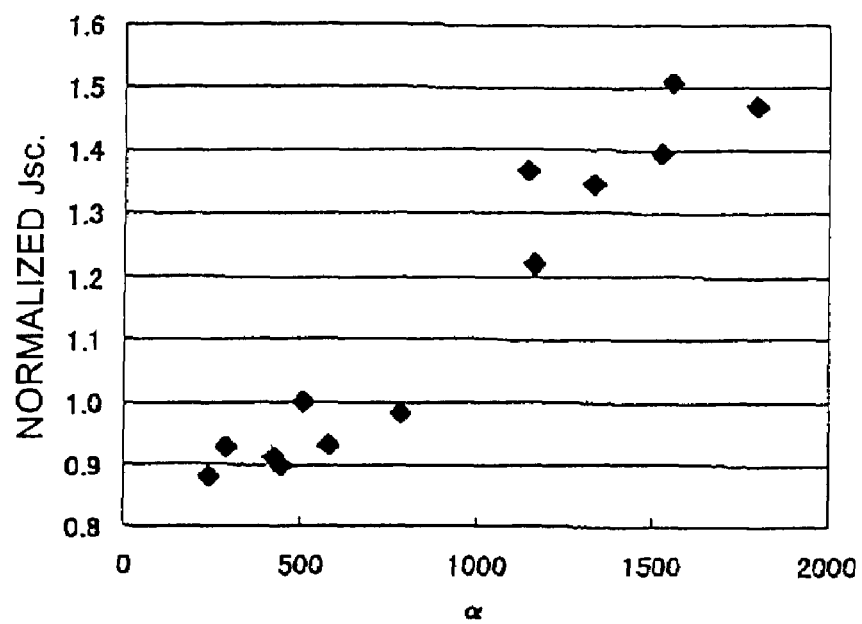
FIG. 10 is a graph illustrating a relationship between the normalized short circuit current density Jsc and the dimensionless amount α of the photovoltaic cell according to Example 2.
Figure 11:
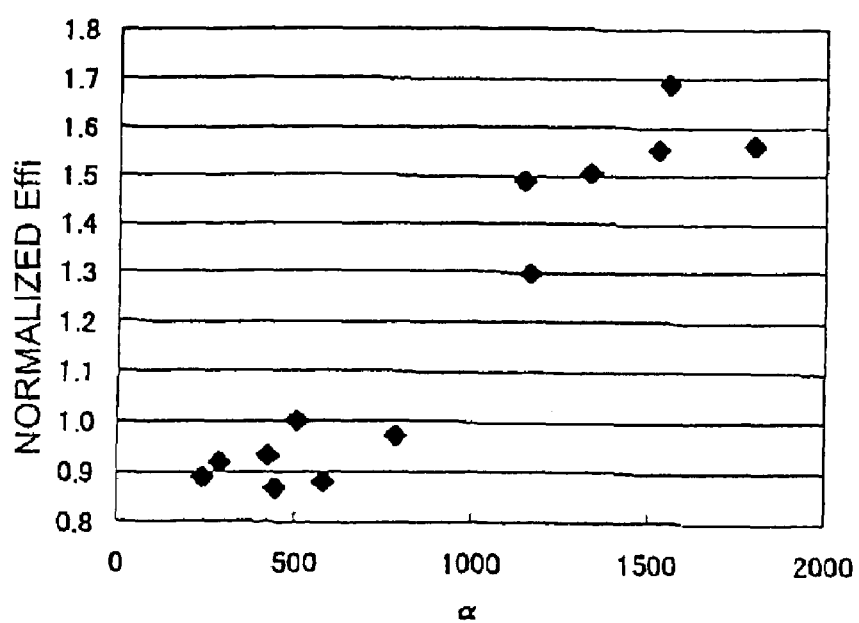
FIG. 11 is a graph illustrating a relationship between the normalized conversion efficiency Effi and the dimensionless amount α of the photovoltaic cell according to Example 2.

FIG. 10 shows a relationship between the short circuit current density Jsc and the dimensionless amount $\alpha$ defined as $\alpha = S \times H \times c$ on condition that the haze rate of the porous semiconductor layer is H (0.6<H<1), a specific surface area is S [$m^2/g$] and surface density is c [$g/m^2$]. FIG. 11 shows a relationship between the conversion efficiency Effi and the dimensionless amount $\alpha$. The figures show that improvement in Jsc is remarkable and the conversion efficiency is improved while maintaining the FF where the dimensionless amount $\alpha$ is 1,000 or more, preferably 1,500 or more.

The photovoltaic cell was manufactured and then disassembled to take out the conductive support 10 and the porous semiconductor layer 20 on which the photosensitive dye was adsorbed. The photosensitive dye was desorbed from the porous semiconductor layer using a $1 \times 10^{-3}$ mol/l NaOH solution. Then, the haze rate H of the conductive support and that of the porous semiconductor layer were measured. As a result, similar to the measurement performed before the adsorption of the photosensitive dye, the haze rate H within the measurement error range was observed.

COMPARATIVE EXAMPLE 1

As an attempt to improve Jsc by means of the prior art, the porous semiconductor layers of varying thicknesses were formed to observe variations in property. The photovoltaic cells were manufactured by a method described in Japanese Unexamined Patent Publication No. 2001-76772. The structure thereof was almost the same as that of the photovoltaic cell according to Example 1 shown in FIG. 1.

As the conductive support 10, was used a glass substrate 11 on which a thin film of fluorine-doped tin oxide ($SnO_2$:F) was formed by sputtering as a transparent electrode layer 12. The conductive support had a flat surface and showed a sheet resistance of 10 $\Omega/\square$ and the haze rate H of 1% or less.

As the counter electrode support 40, was used a glass substrate 41 on which a thin film of fluorine-doped tin oxide ($SnO_2$:F) and a platinum thin film were stacked by sputtering as a counter electrode layer. The sheet resistance thereof was 10$\Omega/\square$.

The porous semiconductor layer 20 was made of $TiO_2$. More specifically, the porous semiconductor layer 20 was formed in the following manner. First, to 315 ml of a nitric acid solution containing titanium ions (titanium ion concentration: 2.0 mol/l), 185 ml of kerosene and a small amount of a dispersing agent were added and stirred to prepare an emulsion. The emulsion was subjected to spray combustion at 700° C. using an emulsion combustion apparatus to obtain $TiO_2$ fine particles. The thus obtained $TiO_2$ fine particles were subjected to heat treatment at 400° C. for 4 hours in an atmospheric air. To 3.0 g of the $TiO_2$ fine particles, 0.1 ml of acetylacetone, 6.0 ml of ion exchanged water and 0.05 ml of a surfactant (Triton-X manufactured by Kishida Chemical Co., Ltd.) were added and mixed to prepare a $TiO_2$ suspension. Then, an adhesive tape (20 to 120 µm thick) was adhered onto the conductive support 10 and the $TiO_2$ suspension was coated thereon in an area of 1 $cm^2$ using a bar coater, followed by drying and heat treatment at 450° C. for 30 minutes. In the above-described manner, the porous semiconductor layers 20 having a thickness of 2 to 25 µm thick were formed on the conductive supports 10.

Measurement of the cathode luminescence property of the porous semiconductor layers 20 on the conductive supports 10 was performed in a vacuum in a dark state. However, light emission was not observed (see FIG. 2). The haze rate H was 30 to 58% regardless of the thickness of the porous semiconductor layer.

After the haze rate H was measured, a photosensitive dye was adsorbed onto the porous semiconductor layer 20. Compound A was used as the photosensitive dye. More specifically, the adsorption of the photosensitive dye was performed by immersing the support on which the $TiO_2$ porous semiconductor layer 20 was formed in a solution of the photosensitive dye in ethanol (the photosensitive dye concentration: $1 \times 10^{-4}$ mol/l) for a day.

As the charge transport layer 30, was used an electrolyte solution containing 0.1 M of lithium iodide, 0.05 M of iodine, 0.6 M of dimethylpropyl imidazolium iodine, 0.5 M of t-butylpyridine and methoxy propionitrile as a solvent.

A thermo-adhesive resin film was used as the sealing material 50. The conductive support 10 and the counter electrode support 40 were bonded by thermocompression to form a framework of the dye-sensitized solar cell, in which the electrolyte solution was injected through a hole (injection hole) of 0.5 mm in diameter opened in the counter electrode support.

Thereafter, the injection hole was sealed with the thermo-adhesive resin film and a glass preparation plate.

Using a solar simulator having an artificial solar light spectrum of AM 1.5, a current-voltage property of the photovoltaic cell formed in the above-described manner was measured to evaluate the photoelectric conversion property.

Figure 12:
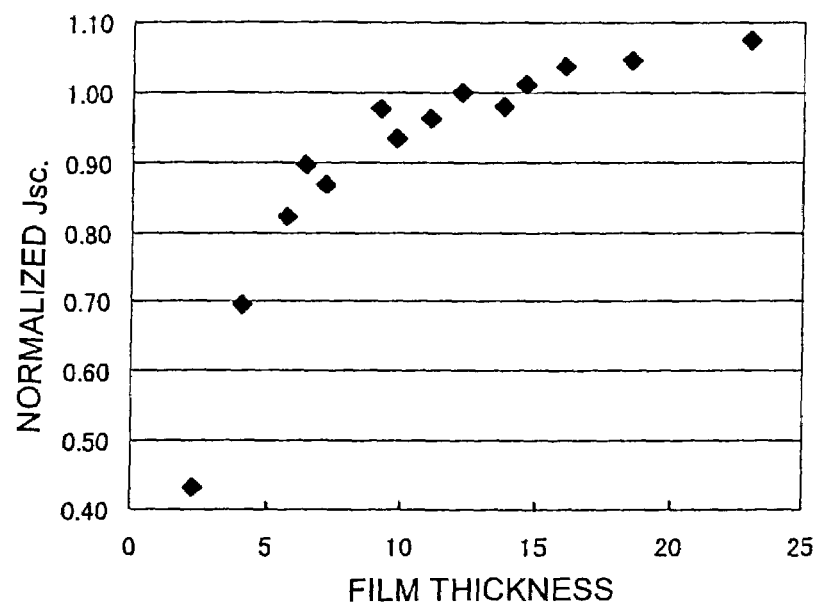
FIG. 12 is a graph illustrating a relationship between the normalized short circuit density Jsc and the thickness of a porous semiconductor layer of a photovoltaic cell according to Comparative Example 1 (prior art)

FIG. 12 shows the dependence of the short circuit current density Jsc on the film thickness and FIG. 4 shows the dependence of the conversion efficiency Effi on the film thickness. The values of the Jsc and the conversion efficiency shown in the figures were standardized by values at the maximum conversion efficiency.

Figure 13:
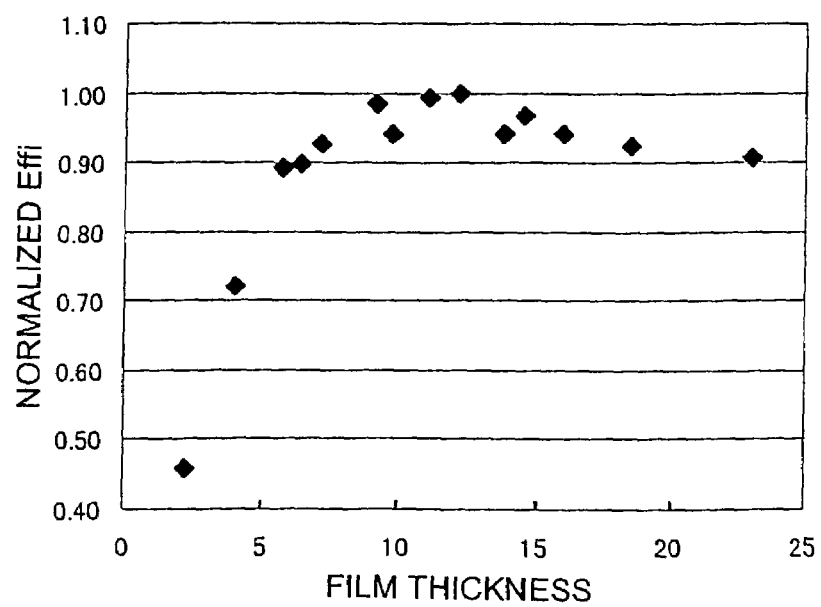
FIG. 13 is a graph illustrating a relationship between the normalized conversion efficiency Effi and the thickness of the porous semiconductor layer of the photovoltaic cell according to Comparative Example 1 (prior art)

As shown in FIG. 12, the Jsc shows a monotonous increase in response to the increase of the film thickness. However, when the thickness exceeds a certain level, the FF is reduced in response to the increase of the film thickness. Therefore, even if the Jsc is improved by increasing the film thickness, there is a limit to the conversion efficiency as shown in FIG. 13.

EXAMPLE 3

Figure 14:
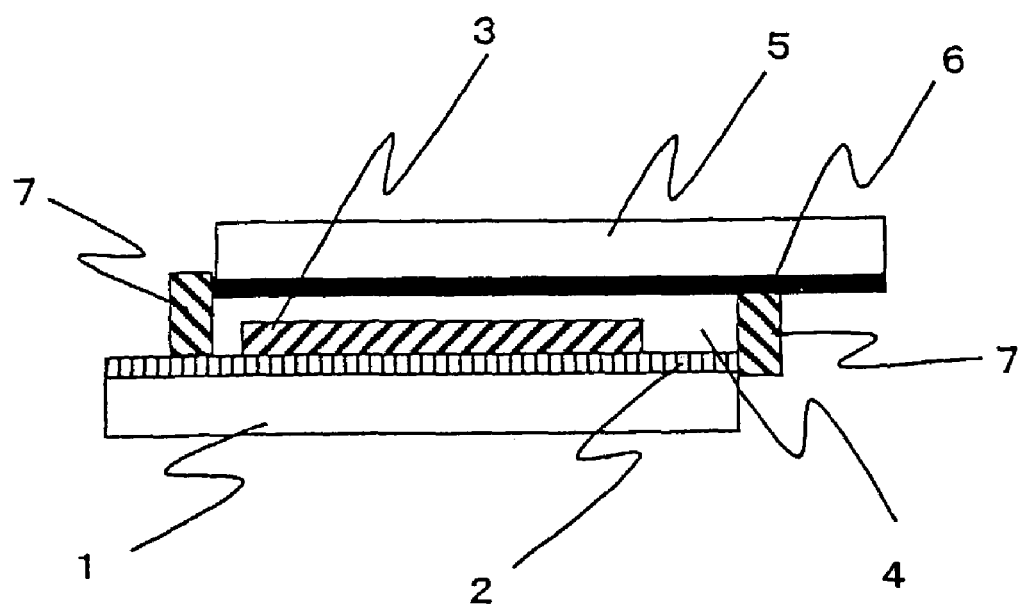
FIG. 14 is a schematic sectional view illustrating still another photovoltaic cell according to the present invention.

A photovoltaic cell according to this example includes, as shown in FIG. 14, a conductive support comprising a support 1 and a conductive film 2, a porous semiconductor layer 3 formed on the conductive support 1, on which a photosensitive dye is adsorbed, a counter electrode support comprising a support 5 and a conductive film 6 and an electrolyte layer filled as a charge transport layer 4 between the porous semiconductor layer 3 and the counter electrode support. The sides thereof are sealed with a sealing material 7.

First, on a glass substrate used as the translucent support 1, an $SnO_2$ film was formed by sputtering as a translucent conductive film 2 of 0.1 μm thick.

Then, titanium oxide paste was coated on the conductive film 2, which was dried and baked to form a titanium oxide film (the porous semiconductor layer 3).

The titanium oxide paste was prepared as follows.

To 750 mL of 0.1 M nitric acid solution (manufactured by Kishida Chemical Co., Ltd.), 125 ml of titanium isopropoxide (manufactured by Kishida Chemical Co., Ltd.) was added dropwise. The resulting mixture was hydrolyzed and heated at 80° C. for 8 hours to prepare a sol.

The resulting sol was placed in a titanium autoclave to grow particles at 250° C. for 10 hours. After ultrasonic dispersion for 30 minutes, a colloid solution containing titanium oxide particles having an average primary particle diameter of 20 nm was obtained.

Using an evaporator, the resulting colloid solution was slowly concentrated to reach the titanium oxide concentration of 15 wt %. Then, ethanol in an amount twice larger than that of the colloid solution was added and centrifuged at 5,000 rpm. The obtained titanium oxide particles were washed, to which ethyl cellulose (Kishida Chemical Co., Ltd.) and terpineol (Kishida Chemical Co., Ltd.) dissolved in anhydrous ethanol were added. This was stirred to disperse the titanium oxide particles. Then, ethanol was evaporated under vacuum of 40 mbar at 50° C. to obtain titanium oxide paste. An adjustment was made so that the resulting titanium oxide paste finally contains 10 wt % of titanium oxide solid, 10 wt % of ethyl cellulose and 64 wt % of terpineol.

Then, the obtained titanium oxide paste was coated on the conductive film 2 using a doctor blade to have a thickness of about 18 μm and an area of about 10 mm×10 mm, which was preliminarily dried at 120° C. for 30 minutes and baked at 500° C. under oxygen for 30 minutes. Thereby, a titanium oxide film of about 14 μm thick (the porous semiconductor layer 3) was formed.

Figure 15:
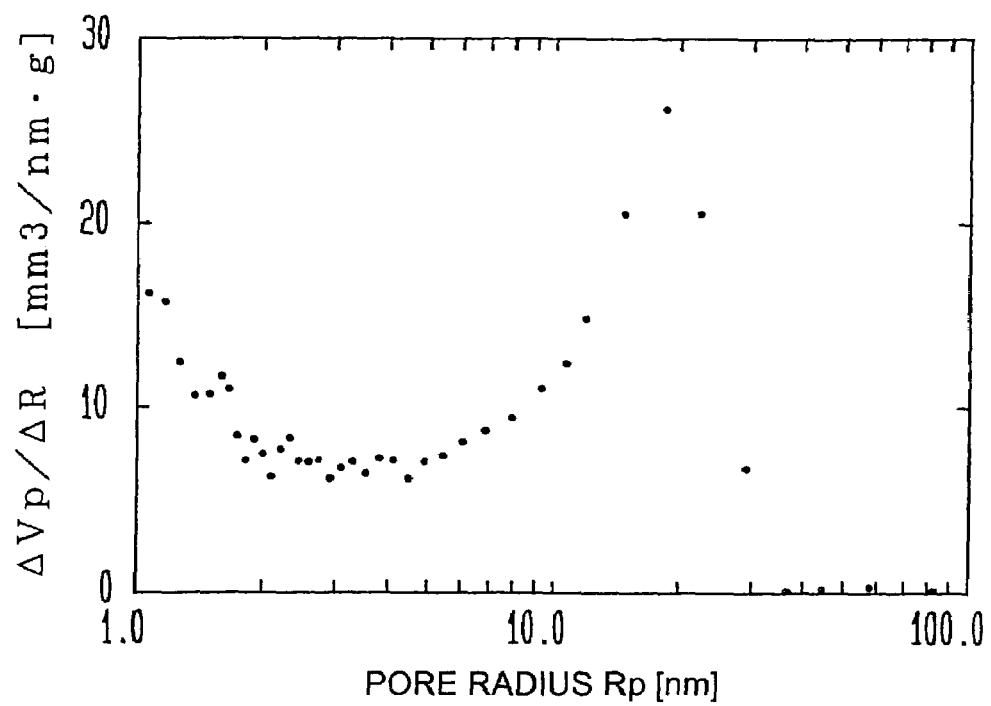
FIG. 15 is a graph illustrating a relationship between the pore radius and the pore volume of a photovoltaic cell according to Example 3.

Using BELSORP 18 manufactured by Bel Japan, INC., a pore radius and pore volume of the resulting titanium oxide film were measured by the D-H method to obtain the change rate of the pore volume with respect to the pore radius. FIG. 15 shows the results.

According to the graph of FIG. 15, the change rate of the pore volume $\Delta Vp/\Delta R$ was at a peak (about 30 $mm^3/nm·g$) when the pore radius was about 11 nm.

Subsequently, a ruthenium dye (Ruthenium 535 manufactured by Solaronix, λmax=540 nm), i.e., compound A represented by the following chemical formula, was dissolved in anhydrous ethanol in a concentration of $4 \times 10^{-4}$ mol/l to prepare an adsorbent dye solution.

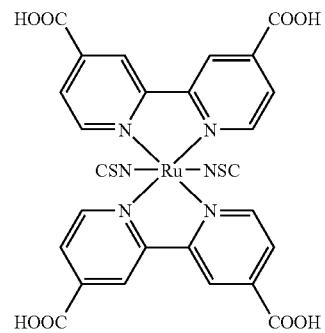

The thus obtained adsorbent dye solution was put in a vessel and the support provided with the titanium oxide film was immersed therein for about 30 minutes, thereby the dye was adsorbed onto the titanium oxide film. Then, the titanium oxide film was washed several times with anhydrous ethanol and dried at about 60° C. for about 20 minutes.

Next, a platinum film was formed by vapor deposition on the support 5 made of ITO glass as a conductive film 6 of 1 μm thick.

Then, the supports 1 and 5 were stacked such that the conductive film 6 and the titanium oxide film were opposed to each other. An oxidation-reduction type electrolyte solution was injected between the supports 1 and 5 and the periphery thereof was sealed with a sealing material 7 of an epoxy resin to form an electrolyte layer.

The oxidation-reduction type electrolyte solution was prepared by dissolving lithium iodide of 0.5 mol/l and iodine of 0.05 mol/l in a mixture solvent of acetonitrile and ethylene carbonate (volume ratio=1:4).

Through the above-described processes, the photovoltaic cell (a super straight type dye-sensitized solar cell) was manufactured.

Photoelectric conversion efficiency of the resulting photovoltaic cell was 7.9% under the measurement condition of AM 1.5 (Table 1).

EXAMPLE 4

A photovoltaic cell and a dye-sensitized solar cell were manufactured in the same manner as Example 3 except that the titanium oxide paste was prepared as follows.

The sol obtained in the method of preparing titanium oxide particles according to Example 3 was placed in a titanium autoclave to grow particles at 250° C. for 12 hours. Thereby, a colloid solution containing titanium oxide particles having an average primary particle diameter of 15 nm was prepared. The titanium oxide particles obtained in this process were referred to as "titanium oxide A".

Using an evaporator, the resulting colloid solution was slowly concentrated to reach the titanium oxide A concentration of 15 wt %. Then, polyethylene glycol (manufactured by Kishida Chemical Co., Ltd., molecular weight 20,000) and commercially available titanium oxide particles (P-25 manufactured by Nippon Aerosil Co., Ltd., a mixture of anatase-type titanium and rutile-type titanium in 7:3 having an average primary particle diameter of 20 nm (hereinafter referred to as "titanium oxide B") were added to prepare titanium oxide paste containing 12 wt % of titanium oxide A, 30 wt % of polyethylene glycol (with respect to titanium oxide A) and 15 wt % of titanium oxide B (with respect to titanium oxide A).

Figure 16:
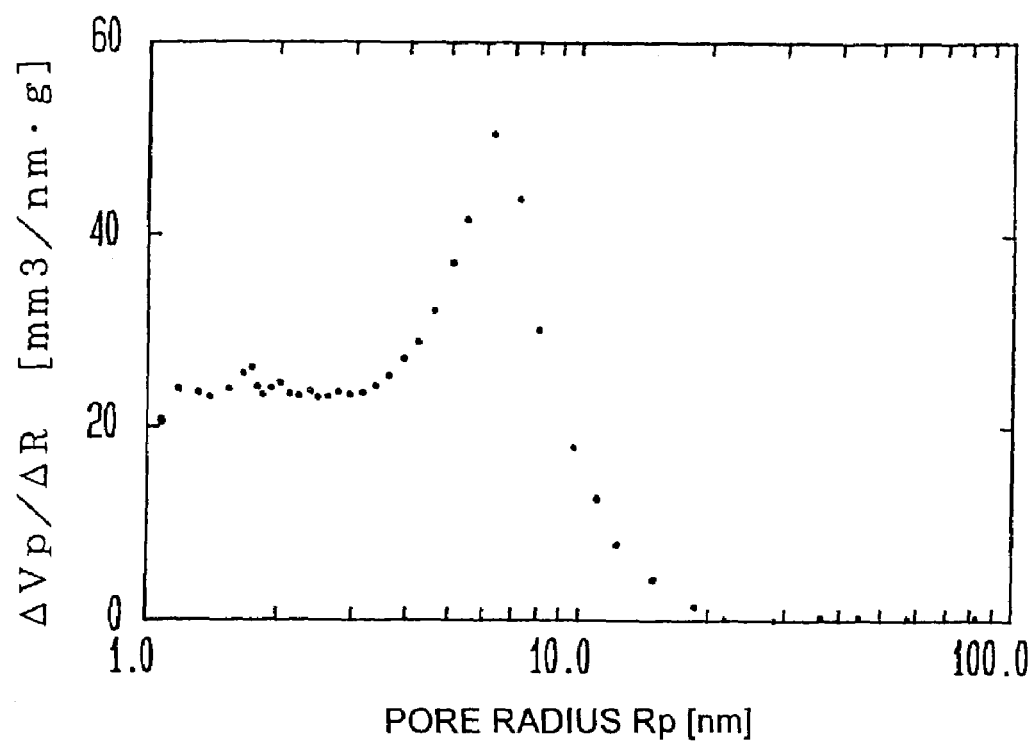
FIG. 16 is a graph illustrating a relationship between the pore radius and the pore volume of a photovoltaic cell according to Example 4.

FIG. 16 shows a relationship between a pore radius and the pore volume of the titanium oxide film obtained in this example. According to the graph of FIG. 16, the change rate of the pore volume ΔVp/ΔR showed a peak value (about 50 mm³/nm·g) when the pore radius was about 6 nm.

The dye-sensitized solar cell manufactured by using the titanium oxide film 3 showed the photoelectric conversion efficiency of 8.7% (Table 1).

COMPARATIVE EXAMPLE 2

A photovoltaic cell and a dye-sensitized solar cell were manufactured in the same manner as Example 3 except that the titanium oxide paste was prepared as follows.

To 12 g of commercially available titanium oxide particles (P-25 manufactured by Nippon Aerosil Co., Ltd., a mixture of anatase-type titanium and rutile-type titanium in 7:3, an average primary particle diameter: 20 nm, a specific surface area of powders: 50 m²/g) contained in a ceramic mortar, was added 4 mL of ion exchanged water in which 0.4 mL of acetylacetone (manufactured by Kishida Chemical Co., Ltd.) was dissolved, which was stirred with a pestle to be dispersed sufficiently. Then, the resulting substance was diluted with 16 mL of ion exchanged water, to which 0.2 mL of a surfactant (Triton-X manufactured by Aldrich) was added to prepare titanium oxide paste.

Figure 17:
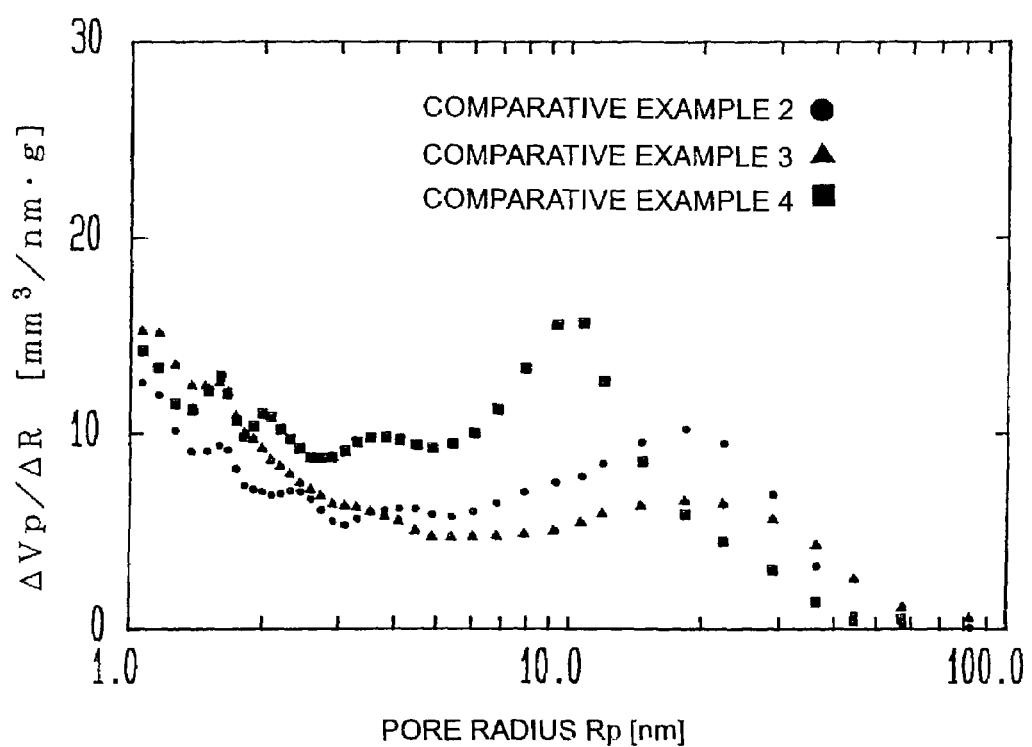
FIG. 17 is a graph illustrating a relationship between the pore radius and the pore volume of a photovoltaic cell according to Comparative Examples.

FIG. 17 shows a relationship between a pore radius and the pore volume of the titanium oxide film obtained in this comparative example. The photoelectric conversion efficiency of the dye-sensitized solar cell obtained in this comparative example was 4.3% (Table 1).

COMPARATIVE EXAMPLE 3

A photovoltaic cell and a dye-sensitized solar cell were manufactured in the same manner as Example 3 except that the titanium oxide paste was prepared as follows.

Titanium oxide paste was prepared in accordance with the preparation method of Comparative Example 2 except that a mixture solution of terpineol (manufactured by Kishida Chemical Co., Ltd.) and butyl carbitol acetate (manufactured by TOKYO KASEI KOGYO Co., Ltd.) added with ethyl cellulose was used in place of the mixture solution of ion exchange water and acetylacetone. The resulting titanium oxide paste contained 13 parts by weight of titanium oxide, 5 parts by weight of ethyl cellulose, 41 parts by weight of terpineol and 41 parts by weight of butyl carbitol acetate.

FIG. 17 shows a relationship between a pore radius and the pore volume of the titanium oxide film obtained in this comparative example. The photoelectric conversion efficiency of the dye-sensitized solar cell obtained in this comparative example was 3.9% (Table 1).

COMPARATIVE EXAMPLE 4

A photovoltaic cell and a dye-sensitized solar cell were manufactured in the same manner as Example 3 except that the titanium oxide paste was prepared as follows.

First, 30 mL of titanium chloride (IV) (98%, manufactured by Kishida Chemical Co., Ltd.) was added dropwise to ice-cold ion exchanged water (300 mL). The resulting solution was hydrolyzed by boiling and kept stand to cool to room temperature, followed by filtration. Then, the filtrate was added to an ammonium sulfate solution (manufactured by Kishida Chemical Co., Ltd.), which was boiled and added with ammonia water as appropriate to improve a yield of titanium oxide. The pH was adjusted to 1.0.

Then, the obtained titanium oxide were placed in a titanium autoclave to grow particles at 220° C. for 10 hours. After ultrasonic dispersion for 30 minutes, a colloid solution containing titanium oxide particles having an average primary particle diameter of 19 nm was prepared.

Using an evaporator, the resulting colloid solution was slowly concentrated to reach the titanium oxide concentration of 15 wt % and polyethylene glycol (manufactured by Kishida Chemical Co., Ltd., molecular weight 20,000) was added thereto. Thereby, titanium oxide paste containing 12 wt % of titanium oxide and 30 wt % of polyethylene glycol (with respect to titanium oxide weight) was prepared.

FIG. 17 shows a relationship between a pore radius and the pore volume of the titanium oxide film obtained in this comparative example. The photoelectric conversion efficiency of the dye-sensitized solar cell obtained in this comparative example was 5.1% (Table 1).

TABLE 1

| | Photoelectric conversion Efficiency (%) |
|---|---|
| Example 3 | 7.9 |
| Example 4 | 8.7 |
| Comparative Example 2 | 4.3 |
| Comparative Example 3 | 3.9 |
| Comparative Example 4 | 5.1 |

The above-described results indicate that high photoelectric conversion efficiency was shown in the dye-sensitized solar cell of the present invention using the porous semiconductor layer having the change rate of the pore volume ΔVp/ΔR of 20 mm³/nm·g or more with respect to a predetermined pore radius.

The specific surface area, which has been used as an index of general evaluation, was measured by a BET method. As a result, the porous semiconductor layers of Example 4 and Comparative Example 4 showed similar values of 65 m²/g and 61 m²/g, respectively. However, solar cells using the porous semiconductor layers have a great difference in photoelectric conversion efficiency. In the actual dye-sensitized solar cell, a dye is adsorbed on the porous semiconductor layer and carriers are excited in the dye to drive the solar cell. Therefore, even if the solar cells have the similar specific surface area, the photoelectric conversion efficiency varies if there is a difference in the number and the size of effective pores which adsorbs the dye.

From this point of view, in the dye-sensitized solar cell comprised of the photovoltaic cell using the porous semiconductor layer having the change rate of the pore volume ΔVp/ΔR of 20 mm³/nm·g or more with respect to a predetermined pore radius, excellent photoelectric conversion efficiency is shown because it includes a large number of the effective pores which can adsorb the dye. Further, for the same reason, if the dye-sensitized solar cell includes the porous semiconductor layer having the change rate of the pore volume ΔVp/ΔR which reaches a peak when the pore radius is 10 nm or smaller and is 20 mm³/nm·g or more at any time when the pore radius is in the range of 1 to 10 nm, higher photoelectric conversion efficiency is observed.

The photovoltaic cell and the dye-sensitized solar cell according to the present invention include the anode electrode comprised of the porous semiconductor layer having the haze rate H of 60% or more at a wavelength in a visible region and a cathode luminescence peak in the visible region (400 to 700 nm). Therefore, improvement in Jsc and high FF are both achieved. That is, by controlling the haze rate H to 60% or more, the number of times of light irradiation to the photosensitive dye increases, the light absorption amount increases and the Jsc improves remarkably. Further, the porous semiconductor layer having the cathode luminescence property is a high quality film having high crystallinity, which reduces a loss due to internal resistance as compared with a film without the cathode luminescence property, even if the thickness and the adsorption amount of the photosensitive-dye are fixed. In other words, the dye-sensitized solar cell with high efficiency is provided by improving the Jsc without reducing the FF. In particular, since the element and the solar cell of the present invention have the cathode luminescence peak in the visible region, recombination does not occur upon actual use. Therefore, reduction of the Jsc due to the recombination current does not occur, thereby maintaining high Jsc.

Further, in the case where the anode electrode satisfies the condition that the dimensionless amount α is 1,000 or more, the Jsc is improved without reducing the FF because the dimensionless amount α is a product of a physical amount Sc related to an effective surface area of the film and the haze rate H which is a physical amount related to the number of times of light irradiation to the photosensitive dye molecules.

Still further, the porous semiconductor layer having the change rate of the pore volume of 20 mm$^3$/nm·g or more adsorbs a sufficient amount of the dye and the photovoltaic cell and the dye-sensitized solar cell using the porous semiconductor layer show excellent photoelectric conversion efficiency.

Yet further, according to the method of manufacturing the photovoltaic cell of the present invention, the anode electrode is formed using material and conditions selected such that the anode electrode has the property of causing cathode luminescence having a luminous peak wavelength in a visible region and shows the haze rate H of 60% or more at a wavelength in the visible region. Moreover, the haze rate H at a wavelength in the visible region is measured after the porous semiconductor layer is formed (before the porous semiconductor layer adsorbs the photosensitive dye) such that the porous semiconductor layer showing the haze rate H of 60% or more is sorted out and the dye-sensitized solar cell is manufactured using the sorted porous semiconductor layer. Therefore, highly efficient dye-sensitized solar cell is manufactured with stability and high yield at low cost.

What is claimed is:

1. A photovoltaic cell comprising:
    an anode electrode including a conductive support and a porous semiconductor layer;
    a photosensitive dye;
    a charge transport layer; and
    a counter electrode support,
    wherein the anode electrode has the property of causing cathode luminescence having a luminous peak wavelength in a visible region and shows a haze rate H of 60% or more at a wavelength in the visible region.

2. A photovoltaic cell according to claim 1, wherein the haze rate H is 80 to 90%.

3. A photovoltaic cell according to claim 1, wherein the anode electrode satisfies the condition that a dimensionless amount α represented by the formula:

$$\alpha = S \times H \times c$$

(wherein H is a haze rate of an anode electrode at a wavelength in the visible region: 0.6 <H <1, S is a specific surface area [m$^2$/g] of the porous semiconductor layer and c is an area density [g/m$^2$] of a porous semiconductor layer) is 1,000 or more.

4. A photovoltaic cell according to claim 3, wherein the dimensionless amount α is 1,500 or more.

5. The photovoltaic cell of claim 1, wherein the photovoltaic cell is a dye sensitized solar cell where the photosensitive dye is adsorbed on a surface and in an inside of the porous semiconductor layer of the cell.

6. A solar cell comprising photovoltaic cells according to claim 1.

7. A photovoltaic cell comprising:
    an anode electrode including a conductive support and a porous semiconductor layer;
    a photosensitive dye;
    a charge transport layer; and
    a counter electrode support,
    wherein the anode electrode shows a haze rate H of 60% or more at a wavelength in the visible region.

8. A photovoltaic cell according to claim 7, wherein the haze rate H is 80 to 90%.

9. A photovoltaic cell according to claim 7, wherein the anode electrode satisfies the condition that a dimensionless amount a represented by the formula:

$$\alpha = S \times H \times c$$

(wherein H is a haze rate of an anode electrode at a wavelength in the visible region: 0.6 <H <1, S is a specific surface area [m$^2$/g] of the porous semiconductor layer and c is an area density [g/m$^2$] of a porous semiconductor layer) is 1,000 or more.

10. A photovoltaic cell according to claim 9, wherein the dimensionless amount α is 1,500 or more.

* * * * *